(12) United States Patent
Swift

(10) Patent No.: US 6,412,350 B1
(45) Date of Patent: Jul. 2, 2002

(54) FORCE SENSING SYSTEM WITH MAGNETIC PRELOADING

(75) Inventor: Gerald Liam Swift, Yaphank, NY (US)

(73) Assignee: Anorad Corporation, Hauppauge, NY (US)

( * ) Notice: Subject to any disclaimer, the term of this patent is extended or adjusted under 35 U.S.C. 154(b) by 0 days.

(21) Appl. No.: 09/635,188

(22) Filed: Aug. 8, 2000

(51) Int. Cl.[7] .................................................. G01B 7/16
(52) U.S. Cl. ........................................................ 73/779
(58) Field of Search ............................... 73/779, 862.69

(56) References Cited

U.S. PATENT DOCUMENTS

| 4,675,615 A | * | 6/1987 | Branabi ........................ 330/8 |
| 5,057,723 A | | 10/1991 | Umehara et al. |
| 5,177,370 A | * | 1/1993 | Meister ..................... 307/10.1 |
| 5,404,649 A | * | 4/1995 | Hajdukiewicz ............... 33/503 |
| 5,608,270 A | * | 3/1997 | Meister ..................... 307/10.1 |
| 5,652,411 A | | 7/1997 | Scrivener et al. |
| 5,703,553 A | * | 12/1997 | Bushko et al. ............... 335/215 |
| 5,872,319 A | | 2/1999 | Bruns et al. |
| 5,952,744 A | | 9/1999 | Chitayat |

OTHER PUBLICATIONS

"EL W Miniature Load Cell Washer", Entran ePage, pp. 1–3.

* cited by examiner

Primary Examiner—Max Noori
(74) Attorney, Agent, or Firm—Himanshu S. Amin; John M. Miller; Alexander M. Gerasimow

(57) ABSTRACT

A force sensing system includes a pair of spaced apart magnets arranged to repel each other. A force sensor is operatively associated with one magnet of the pair of magnets and spaced apart from the other of the magnets. The one magnet preloads the force sensor based on interactions between magnetic fields of the magnets.

21 Claims, 3 Drawing Sheets

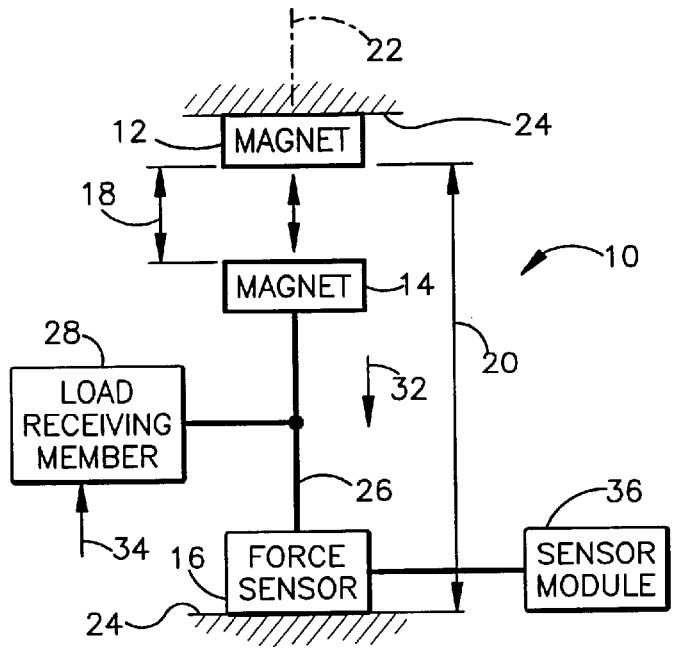
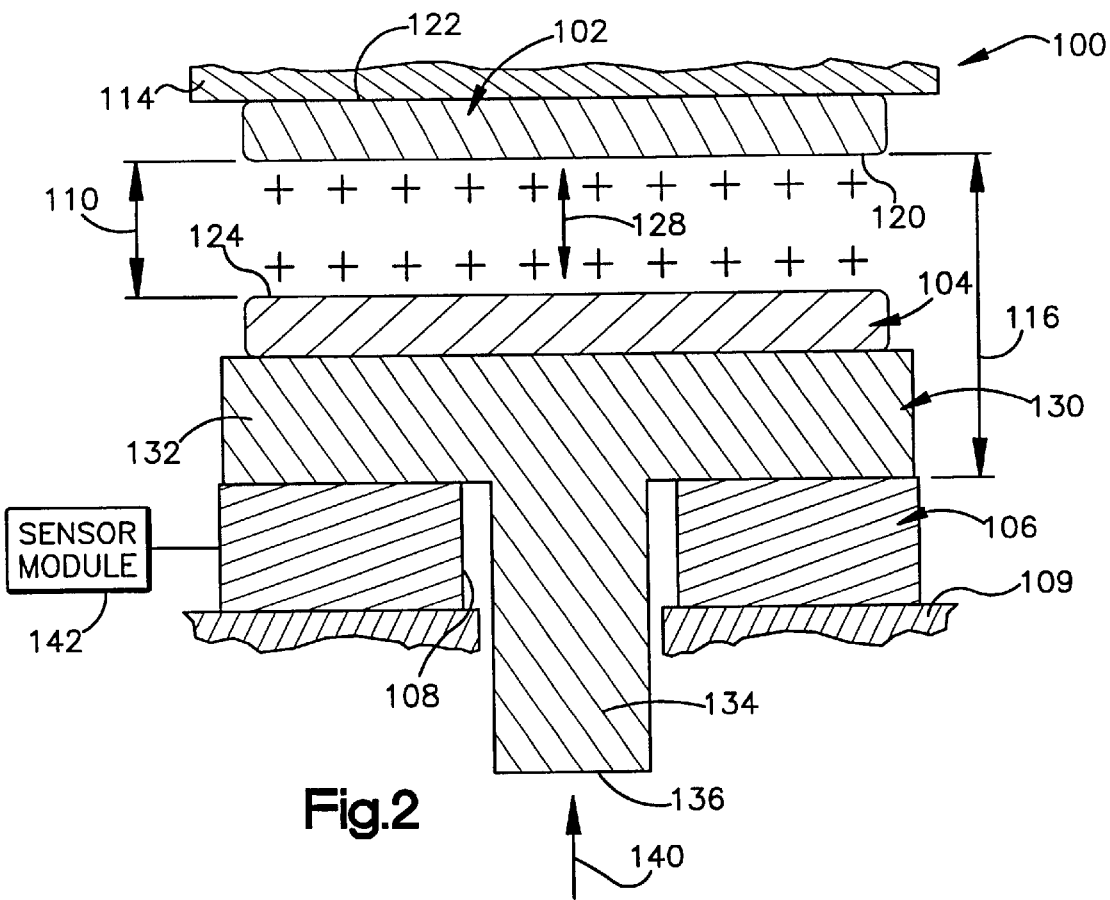

FORCE SENSING SYSTEM WITH MAGNETIC PRELOADING

TECHNICAL FIELD

The present invention generally relates to force sensing and, more particularly to a force sensing system.

BACKGROUND

Various automated manufacturing activities require precise placement and/or grasping of objects, in which contact forces between a manipulator (or other article contacting mechanism) and an object are at a minimum. Many of these activities may be performed by industrial robots having a mechanism for picking-up and placing objects, such as in semiconductor chip manufacturing processes as well as other types of force controlled placement systems.

When an object-receiving feature, for example, contacts an object that is to be moved, there are impact forces between the feature and the object. In order to mitigate the impact forces, the movement of the receiving feature may be controlled, such as based on sensing the impact force.

A typical force sensing system may employ a strain gauge or load cell that that senses forces applied to an associated receiving feature. In one particular application, a spring may be employed to preload a load cell. A spring, however, has memory (e.g., it elastically deforms) and, thus, tends not to return fully to its original configuration after repeated stress. Because of its elastic deformation, a spring tends to degrade over time, changing the preloading characteristics of the associated load cell. This decreases the level of precision in the load cell. A spring also may exhibit resonance as it is loaded and unloaded. The resonance of the spring may, in turn, increase the acquisition cycle time, as the oscillations need time to subside between measurement intervals. Therefore, the overall throughput of an entire system may be adversely affected by the spring.

SUMMARY

The present invention provides for a force sensing system, which may be employed in a manufacturing environment to sense impact force between a feature and an object for example. The subject invention mitigates some of the problems associated with many convention force sensing systems (e.g., spring based systems) which have issues of system degradation and relatively poor cycle time (due to spring resonance), the present invention. By employing a pair of opposing magnetic elements in connection with preloading a force sensor, a force sensing system results which is less prone to system degradation because magnetic elements in accordance with the present invention do not substantially degrade with respect to their magnetic properties. Furthermore, the present invention results in improved cycle time/throughput as compared to spring based systems because the opposing magnets of the present invention damp relatively quickly as compared to many of the conventional systems which are susceptible to spring resonance.

One aspect of present invention relates to a force sensing system that includes a pair of magnets for preloading a force sensor. A first magnet is spaced apart from the force sensor, with the second magnet being located between the first magnet and the force sensor. The magnets are arranged so that sides of each magnet having like polarity face each other (e.g., the magnets repel each other). The second magnet is operatively associated with the force sensor to preload the force sensor based on repulsive forces generated by the first and second magnets. The distance between the magnets, thus, may be controlled to preload the force sensor to a desired amount. The magnetic characteristics of the magnets remain substantially unchanged over time, thereby mitigating system degradation. Additionally, the opposed magnets provide a stiffened response with minimal resonance, thus, permitting faster recovery and increased throughput with the system in accordance with the present invention.

Another aspect of the present invention provides a force sensing system. The system includes a first magnet having a first polarity on a first side and a second polarity on a second side opposite the first side thereof. A second magnet has the first polarity on a first side and the second polarity on a second side opposite the first side thereof. The system also includes a force sensor spaced apart from the first magnet. The second magnet is interposed between the force sensor and the first magnet and the second side of the second magnet faces the second side of the first magnet. The second magnet preloads the force sensor based on interactions between magnetic fields of the first and second magnets.

Another aspect of the present invention provides a force sensing system. The system includes a housing having first and second ends that are spaced apart from each other and a central axis extending through the first and second ends. A force receiving member has a first portion located within the housing substantially transverse relative to the central axis and a second portion extending from a central part of the first portion axially through an aperture in the first end of the housing. A force sensor is located intermediate the first end of the housing and the first portion of the force receiving member. The force sensor has an aperture extending axially through a central part of the force sensor through which the second portion of the force receiving member extends. The force sensor is operative to sense force as a function of position of the force receiving member relative to the housing and the force sensor.

Yet another aspect of the present invention provides a force sensing system. The system includes a pair of opposed magnets spaced apart from and arranged relative to each other so as to repel each other and generate a repulsive force. A force sensor is operatively associated with one magnet of the pair of magnets. The one magnet preloads the force sensor according to the repulsive force of the first and second magnets.

Still another aspect of the present invention provides a force sensing system. The system includes force sensing means for sensing an applied force and magnetic means for preloading the force sensing means. The preloading of the force sensing means varies by an amount functionally related to the applied force.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

BRIEF DESCRIPTION OF THE DRAWINGS

FIG. 1 is block diagram of a system in accordance with the present invention;

FIG. 2 is an example of a force sensing system in accordance with the present invention;

DESCRIPTION OF THE INVENTION

Figure 3:
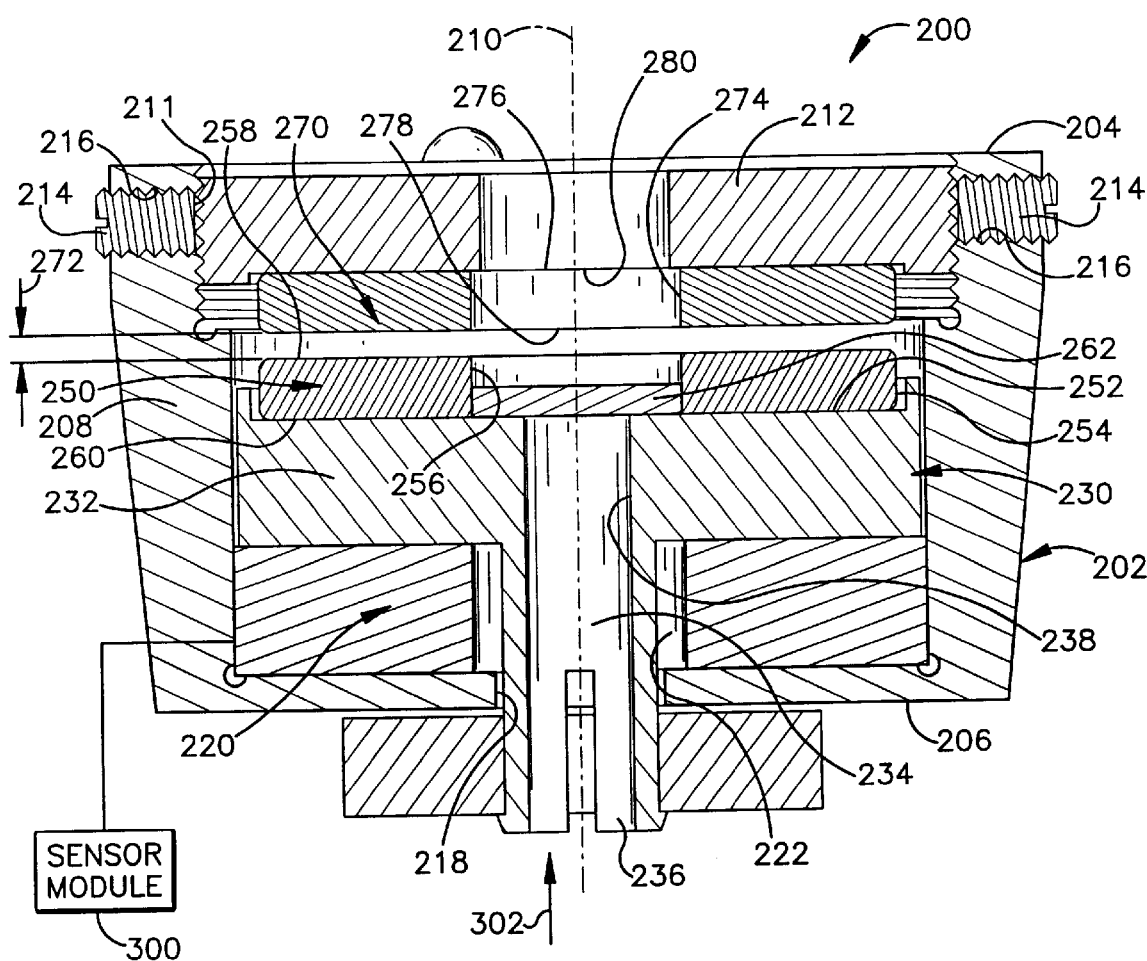
FIG. 3 is another example of a force sensing system in accordance with the present invention.

FIG. 1 is a schematic block representation of a force sensing system 10 in accordance with an aspect of the present invention. The system 10 includes a pair of magnets 12 and 14 arranged relative to a force sensor (e.g., a load cell or strain gauge) 16 to preload the force sensor.

In particular, the magnets 12 and 14 are arranged so that the magnetic fields produced by adjacent sides of the magnets operate to repel the magnets. The pair of magnets is spaced apart from each other a distance, indicated at 18. The repulsive force generated by the magnets 12 and 14 varies as a function of the distance 18. The first magnet 12 is spaced a fixed distance apart from the force sensor 16, indicated at 20. For example, each of the first magnet 12 and force sensor 16 may have movement constrained in an axial direction 22, such as by a structure, indicated schematically at 24.

The second magnet 14 is operatively connected with the force sensor 16 by an operative connection 26. The operative connection 26 may include an intervening structure, such as part of a force receiving member, or be a physical connection between the force sensor 16 and the magnet 14. The operative connection 26 transfers axial forces to the force sensor 16. For example, a load receiving member 28 may be connected to the magnet 14 via the operative connection 26. As a result, the magnet 14 receives axial forces, which may include the repulsive forces caused by the interacting magnetic fields of the first and second magnets 12 and 14 as well as axial forces applied to the load receiving member 28. The axial forces are, in turn, transferred to the force sensor 16 through the operative connection 26. That is, the force sensor 16 is exposed to axial forces equal to the sum of the preloading forces due to the magnetic interactions of the magnets 12 and 14 and the forces due to external loading.

By way of example, if the forces due to the magnetic interactions preload the force sensor 16 in a first direction (32) by a first amount and the external load is applied to the load receiving member 28 at a second amount in an opposite direction (34), the external load may accurately be determined as a function of the change in the load sensed by the force sensor. An external electronic sensor module 36 may be operatively associated with the force sensor 16 for receiving a sensor signal indicative of the load sensed by the force sensor. The sensor module 36, in turn, is programmed and/or configured to determine a corresponding indication of the external load, such as may be applied to the load receiving member 28.

FIG. 2 illustrates another example of a force sensing system 100 in accordance with an aspect of the present invention. The system 100 includes a pair of magnets 102 and 104 arranged and configured to preload a force sensor 106.

In this example, the force sensor 106 is illustrated as a substantially flat structure having a central aperture 108 extending axially through the sensor. The force sensor 106 engages and may be stationary relative to a fixed structure 109, such as a housing. The force sensor 106, for example, may be a load cell, a strain gauge, or other device responsive to the application and/or removal of an applied force. Examples of load cells and strain gauges that may be implemented in a system, in accordance with an aspect of the present invention, are commercially available from Entran Devices, Inc., of Fairfield, N.J. Those skilled in the art will appreciate that other force/load sensing devices also may be employed in accordance with the present invention.

The magnets 102 and 104 are substantially flat magnetic discs that are arranged in a parallel relationship so that the magnets repel each other. The magnets 102 and 104 may be substantially identical permanent magnets. The magnets 102 and 104 are spaced apart from each other by a distance, indicated at 110. The magnet 102 is operatively connected with a fixed structure, indicated schematically at 114, so as to inhibit random axial movement of the magnet 102 relative to the force sensor 106. The other magnet 104 is moveable relative to the force sensor 106 and the first magnet 102, such as in response to an externally applied load.

The magnet 102 is spaced apart from the force sensor 106 by a distance indicated at 116. The distance 116 between the magnet 102 and the force sensor 106 may be adjustable, for example, by threading an adjustment feature to which the first magnet is attached relative to a structure fixed relative to the sensor 106. In the system 100 of FIG. 2, adjusting the relative distance between the magnet 102 and the sensor 160 (in the absence of an external load) also may change the distance 110 between the magnets 102 and 104. The magnetically generated forces between the first and second magnets 102 and 104 vary as a function of the distance between the magnets. The magnetically induced forces between the magnets 102 and 104 urge the magnet 104 toward the force sensor 106, thereby preloading the sensor. The amount of preloading thus varies according the distance between the magnets 102 and 104.

As mentioned above, the magnets 102 and 104 are arranged so as to repel each other. A side 120 of the magnet 102 facing the magnet 104 has a first polarity (e.g., positive) the other side 122 of the magnet 102 has an opposite polarity (e.g., negative). The other magnet 104 is interposed between the force sensor 106 and the magnet 102. A side 124 of the second magnet 104 facing the magnet 102 has the same polarity (e.g., positive) as the adjacent side 120 of the magnet 102. As a result, the magnetic field provided by each magnet 102, 104 generates repulsive forces to repel the magnets from each other in an axial direction, indicated at 128. The second magnet 104 is mounted in the assembly so as to permit its movement in an axial direction relative to the force sensor 106 and the magnet 102.

The system 100 also includes a force receiving member 130 interposed between the magnet 104 and the force sensor 106. By way of example, the force-receiving member 130 is a generally T-shaped collet having a generally flat portion 132 located between the magnet 104 and the force sensor 106. An elongated arm portion 134 extends axially from a central part of the flat portion 132 through the aperture 108 in the sensor 106 and terminates in an end tip 136 located external to the sensor and magnet arrangement.

As an axial force 140 is applied at the end tip 136, the member 130 urges the second magnet 104 toward the first magnet 102. This, in turn, reduces the preloading of the force sensor 106 by an amount proportional to an axial component of the force 140 applied at the end tip 136, such as by the contact between the end tip and an object or component. Therefore, by knowing the initial amount of preloading caused by the magnets 102 and 104, the force 140 applied at the end tip 136 may be determined as a function of the change in the preloading, such as by an associated electronic module 142 operatively connected to the force sensor 106.

By way of example, the force sensor 106 may be load cell that provides to the sensor module 142 a voltage signal proportion to an applied load. The load cell may be preloaded to desired level, such as based on a percentage of its nominal, fully-loaded output voltage, and provide an output signal indicative of the preloading from the magnets 102 and 104. As force 140 is applied at the end tip 136 in the direction of the force sensor 106, the preloading is reduced by an amount proportional to the applied force. The force sensor signal, thus, changes to reflect the change in preloading. The sensor module 142 is programmed and/or configured to determine a quantitative value for the applied force and provide an applied force signal indicative thereof. The applied force signal may be employed to control associated equipment or movement of system in an axial direction. Those skilled in the art will appreciate various uses for a system in accordance with the present invention.

If an applied force exceeds the repulsive forces of the magnets 102 and 104, such as in response to impact by an object, the preloading of the sensor 106 by the magnets may be entirely be removed. In particular, the force receiving member 130 may be urged out of engagement relative to the force sensor 106 and may urge the magnets 104 and 106 into engagement. As a result, the magnets 104 and 106 and the force receiving member 130, not the force sensor 106, receive the impact of such excessive loads.

Figure 4:
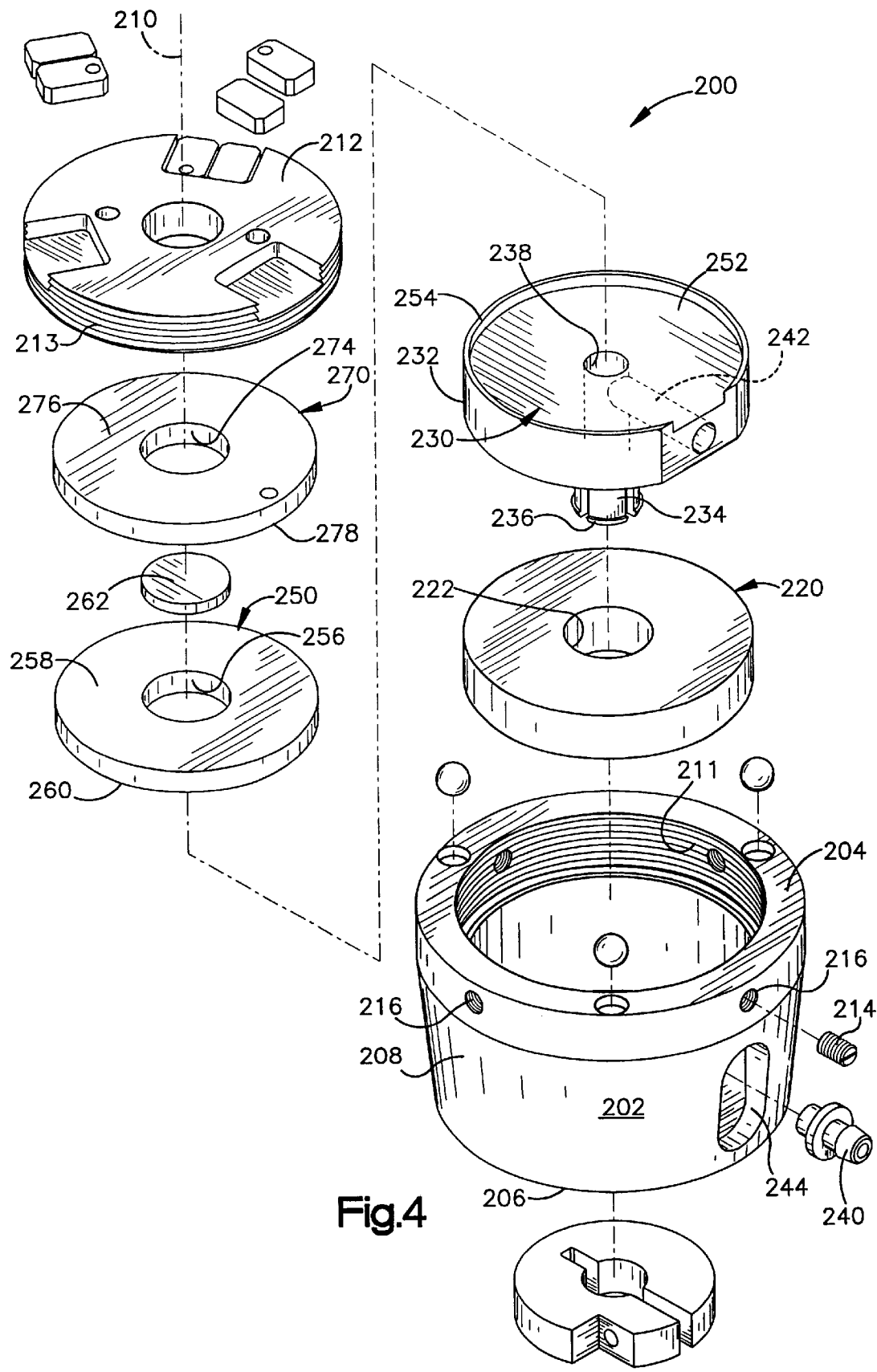
FIG. 4 is an exploded view of the system of FIG. 3 in accordance with the present invention.

FIGS. 3 and 4 illustrate another example of a force sensing system 200 in accordance with an aspect of the present invention. By way of example, the force sensing system 200 may be implemented in connection with a robotic actuator system, such as a pick and place system. An example of a rotary-linear actuator system that may be adapted to employ a load sensing system in accordance with an aspect of the present invention is disclosed in U.S. Pat. No. 5,952,744, which is incorporated herein by reference.

Referring to FIGS. 3 and 4, the system 200 includes a housing 202 having first and second end portions 204 and 206, respectively, that are spaced apart from each other by a generally cylindrical sidewall portion 208. The housing 202 may be a substantially cup- or U-shaped housing. A central axis 210 extends through the end portions 204 and 206 of the housing 202 and the system 200. The first end 204 of the housing 202 has internal threads 211 about the axis for receiving an end cap 212. The end cap 212 has external circumferential threads 213 for being threaded into the mating threads 211 at first end 204 of the housing 202. The end cap 212 may be secured relative to the housing 202 by inserting one or more set screws 214 through radial bores 216 formed in the sidewall 208 at the first end 204 of the housing 202. The other end portion 206 has a central aperture 218 extending axially through an end plate of the housing 202. The housing 202 may be formed of any substantially rigid material, such as a polymer, a metal, a composite material, etc.

A force sensor 220 is positioned within the housing 202 adjacent the second side portion 206 of the housing. The illustrated example of the sensor 220 is a substantially flat, annular shaped sensor having a central aperture 222 extending axially through the sensor. The sensor aperture 222, for example, may be aligned substantially coaxial with the housing aperture 216. The force sensor 220, for example, may be a load cell, a strain gauge, or other device responsive to the application and/or removal of an applied force, such as are commercially available from Entran Devices, Inc., of Fairfield, N.J. Those skilled in the art will appreciate that other force responsive sensing devices also may be employed in accordance with the present invention.

The system 200 also includes a force-receiving member 230 for receiving an applied force and for transferring such force to the force sensor 220. By way of example, the force-receiving member 230 is a generally T-shaped collet having a generally flat, annular portion 232 that engages the force sensor 220, such that the force sensor is sandwiched between the annular portion of the collet and the second end portion 206 of the housing 202. An elongated cylindrical arm portion 234 extends axially from a central part of the flat portion 232 through the respective apertures 222 and 218 in the sensor 220 and second end portion 206 of the housing 202. The arm portion 234 terminates in a slotted end tip 236 located external to the housing for receiving an applied load. The arm portion 234 may be hollow, such that an elongated central aperture 238 extends axially through the entire collet.

A pneumatic fitting (FIG. 4) 240 may be attached to the annular portion 232 of the collet in fluid communication with a radially extending bore 242 formed in the annular portion. The bore 242 provides a passage between an outer periphery of the flat portion 232 and the elongated central aperture 238 of the collet. The fitting may extend through a slot 244 formed in the sidewall 208 of the housing. The slot 244 should extend axially a distance sufficient to allow for movement of the fitting 240 commensurate with the potential axial movement of the force receiving member 230 relative to the housing 202. The fitting 240, for example, may be connected to a vacuum source. The vacuum source may be selectively activated to provide a vacuum pick-up function at the end tip 236, as is known in the art, for example, to facilitate placement of components (e.g., semiconductor chips).

A permanent magnet 250 is mounted to a receiving end 252 of the annular portion 232 of the collet distal the force sensor 220, such as by bonding it to the collet with a suitable adhesive. The receiving end 252 may include a lip 254 along its perimeter that is dimensioned and configured for receiving the magnet 250. The magnet 250, for example, is a substantially flat disc of a permanent magnetic material having a central aperture 256 extending from one side 258 of the magnet through to the other side 260. The magnet aperture 256 may be about the same diameter as the aperture 222 of the force sensor 220.

When assembling the system 200, for example, the magnet 250 may be attached to the receiving end 252 of the collet prior to inserting the collet into the housing 202. Then, a subassembly of the magnet 250 and the force receiving member 230 may be inserted into the housing 202 so that the elongated arm 234 passes through apertures 222 and 216 in the force sensor 220 and the housing, respectively. The subassembly of the force receiving member (e.g., collet) 230 and the magnet 250 are moveable relative to the force sensor 220 and the housing 202. While the force receiving member 230 engages the force sensor 220, axial movement of member relative to the force sensor loads and unloads the force sensor accordingly.

A transparent shield 262, such as may be formed of glass or another transparent material, may cover the collet aperture 238. For example, the shield may have an outer diameter that approximates the diameter of the magnet aperture 256 (which is larger than the aperture 238) so as to fit snuggly within the magnet when the system 200 is assembled, such as shown in FIG. 3. The shield 262 provides a dual purpose. It allows an individual to (e.g., with image collection device) to view through the system 200 an object or component (or the absence thereof) at the end tip 236. The shield 262 also directs vacuum suction from the fitting 240 axially to within the collet aperture 238.

The system 200 includes another magnet 270 spaced apart from the magnet 250 a distance, indicated at 272. The magnets 250 and 270 may be substantially identical in configuration. Briefly stated, the magnet 270 is a substantially flat, disc-shaped permanent magnet having a central aperture 274 formed through opposed sides 276 and 278 of the magnet 270. The magnet 270 is fixed relative to the housing 202, such as by attaching it to the end cap 212 of the housing. For example, the magnet 270 may be bonded to an inner receiving surface 280 of the end cap 212, such as with an appropriate adhesive material. The distance 272 between the pair of magnets 250 and 270 may be adjustable. For example, the end cap 212 may be selectively threaded into the first end 204 the housing 202 to position the magnet 270 at a desired axial position.

The magnets 250 and 270 are arranged substantially parallel to each other and are oriented so that the magnets repel each other. In particular, the sides 258 and 278 of the respective magnets 250 and 270 that face each other have the same magnetic polarity (e.g., positive). The other sides 260 and 276 also have a common polarity (e.g., negative) opposite that of the sides 258 and 278. The repulsive force generated from the opposed magnets 250 and 270 varies as a function of the distance 272 (e.g., an air gap) between the magnets. That is, the repulsive force increases proportional to a decrease in the distance 272 between the magnets 250 and 270 and decreases with a corresponding increase in the distance 272. The sidewall 208 of the housing 202 keeps the magnets aligned axially so that the repulsive forces are substantially axial forces.

Because the magnet 270 and the force sensor 220 are spaced apart a fixed distance (e.g., determined in response to threading the end cap 212 onto the housing 202), the repulsive force between the magnets 250 and 270 is transferred from the magnet 250 through the force receiving member 230 and to the force sensor 220. This preloads the force sensor 220. The amount of preloading may be adjusted by adjusting the distance 272 between magnets 250 and 270 (e.g., threading the end cap 212 toward or away from the force sensor).

An external sensor module 300, for example, may be employed to monitor an electrical signal provided by the force sensor 220 so that a desired amount of preloading may be achieved. The electrical signal provided by the force sensor 220 may be a voltage signal that ranges between predetermined voltage values to indicate an amount of force applied to the sensor. For example, it may be desired to preload the force sensor 220 to near its maximum load capacity, such as to about ninety percent of its capacity, such as based on manufacturer specifications for the force sensor 220. The sensor module 300 or other associated electronics may be monitored as the end cap 212 is threaded in an appropriate direction relative to the housing 202 to achieve a desired amount of preloading. For example, a nominal air gap 272 (e.g., about 0.03 inches) may be employed to preload the sensor 220 to about ninety percent of its maximum loading capacity. Those skilled in the art will understand and appreciate that a distance 272 between the magnets 250 and 270 to achieve a desired amount of preloading will vary based, among other things, the magnets themselves, the housing configuration and the type and configuration of the load sensor 220. After a desired level of preloading is achieved, the end cap 212 may be secured relative to the housing 202 by one or more set screws 214 to set the preloading force within the system 200.

As an external force 302 in the axial direction is applied to the end tip 236, such as in response to an object (or component) contacting the end tip, the force receiving member (e.g., collet) 230 urges the magnet 250 toward the other magnet 270. This, in turn, reduces the preloading of the force sensor by an amount proportional to an axial component of the force imparted by the force applied at the end tip 236. Therefore, because the initial preloading of the force sensor 220 due to the repulsive forces of the magnets 250 and 270 is known, the externally applied axial force 302 at the end tip 236 may easily be determined by the associated sensor module 300 as a function of the sensed change (e.g., a reduction or increase) in the loading experienced by the force sensor. Depending on the sensitivity of the force sensor 220, for example, the magnet 250 and the force receiving member 230 may traverse an axial distance of about 0.0005 inches between the loaded and unloaded conditions of the force sensor.

In view of the foregoing description with respect to FIGS. 1–4, those skilled in the art will appreciate many benefits of a force sensing system in accordance with the present invention. Advantageously, absent exposure to extreme temperatures, the preloading magnets generally do not degrade over time, prolonging the accuracy of a system in accordance with an aspect of the present invention. The preloading magnets also preload the force sensor with sufficient stiffness so as to inhibit resonance between the magnets as an external load is applied or removed. Because little or no physical resonance occurs between the magnets, the system does not require substantial wait time (as to mechanical springs) to dampen between measurement cycles and, thus, an increased throughput may be achieved.

Additionally, because the force receiving member (e.g., collet) is positioned for movement relative to the force sensor, if an excessive load is applied to the end tip (e.g., a force greater than the repelling forces of the magnets), the force sensor does not bear such loads, such as may occur from impact. As a result, damage to the force sensor may be mitigated. This is advantageous as the force sensor often is a costly part of the system.

What has been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising."

What is claimed is:

1. A force sensing system comprising:
   a first magnet having a first polarity on a first side and a second polarity on a second side opposite the first side thereof;
   a second magnet having the first polarity on a first side and the second polarity on a second side opposite the first side thereof; and
   a force sensor spaced apart from the first magnet, the second magnet being interposed between the force sensor and the first magnet, the second side of the second magnet facing the second side of the first magnet;
   wherein the second magnet preloads the force sensor based on interactions between magnetic fields of the first and second magnets.

2. The system of claim 1 further including a housing having first and second ends spaced apart from each other and a central axis extending through the first and second ends of the housing, the first magnet being mounted near the first end of housing, the force sensor located near the second end of the housing, and the second magnet located within the housing between the first magnet and the force sensor.

3. The system of claim 2, further including a force receiving member having a proximal portion interposed between the second magnet and the force sensor and a distal portion extending axially from the proximal portion to a location external to the housing, the second magnet engaging the proximal portion and urging the force receiving member into engagement with the force sensor to preload the force sensor.

4. The system of claim 3, wherein the second magnet is a substantially flat annular magnet, the first side of the second magnet being attached to the proximal portion of the force receiving member.

5. The system of claim 3, wherein the distal portion of the force receiving member terminates in an article receiving end located external to the housing, the force receiving member being urged in the direction of the first end of the housing in response to a force applied at the article receiving end, thereby reducing the distance between the first and second magnets and, in turn, reducing the preloading of the force sensor by an amount proportional to the applied force.

6. The system of claim 5, wherein the second end portion of the housing and the force sensor each has an aperture extending axially therethrough, the distal portion of the force receiving member extending through the respective apertures of the housing and the force sensor.

7. The system of claim 2, wherein the housing is threaded at the first end, the system further including a threaded end cap to which the first magnet is attached, the end cap being threaded onto to the first end to selectively position the first magnet at an axial position relative to the second magnet for preloading the force sensor a desired amount.

8. The system of claim 2, wherein each of the first and second magnets is an annular-shaped magnet having a central aperture extending therethrough substantially coaxial with the central axis.

9. The system of claim 1, wherein the preloading of the force sensor varies as a function of the distance between the first magnet and the force sensor.

10. A force sensing system comprising:
    a housing having first and second ends that are spaced apart from each other and a central axis extending through the first and second ends;
    a force receiving member having a first portion located within the housing substantially transverse relative to the central axis and having a second portion extending from a central part of the first portion axially through an aperture in the first end of the housing; and
    a force sensor located intermediate the first end of the housing and the first portion of the force receiving member, the force sensor having an aperture extending axially through a central part of the force sensor through which the second portion of the force receiving member extends;
    wherein the force sensor is operative to sense force as a function of position of the force receiving member relative to the housing and the force sensor.

11. The system of claim 10 further including a pair of opposed magnets spaced apart from and arranged relative to each other so as to repel each other, one magnet of the pair of magnets being attached to the first portion of the force receiving member distal the force sensor, the second magnet being mounted near the second end of the housing, the one magnet urging the first portion of the force receiving member against the force sensor to preload the force sensor according to a repulsive force generated between the pair of magnets.

12. The system of claim 11, wherein the housing is threaded at the first end, the system further including a threaded end cap to which the first magnet is attached, the end cap being threaded onto to the first end of the housing to selectively position the other magnet of the pair of magnets at an axial position relative to the one magnet for preloading the force sensor a desired amount.

13. A force sensing system comprising:
    force sensing means for sensing a force applied relative to the force sensing means; and
    magnetic means for preloading the force sensing means in a first direction relative to the force sensing means, applied force including the preloading; and
    force receiving means, part of the force receiving means being interposed between the force sensing means and the magnetic means for transferring the applied force to the force sensing means.

14. A force sensing system comprising:
    a pair of opposed magnets spaced apart from and arranged relative to each other so as to repel each other and generate a repulsive force;
    a force sensor for sensing force applied relative to the force sensor, the force sensor being operatively associated with one magnet of the pair of magnets, the one magnet preloading the force sensor according to the repulsive force; and
    a housing having first and second ends spaced apart from each other and a central axis extending through the first and second ends of the housing, another magnet of the pair of magnets being mounted near the first end of housing, the force sensor located near the second end of the housing, the one magnet located within the housing between the other magnet and the force sensor.

15. The system of claim 14, further including a collet having a proximal portion interposed between the one magnet and the force sensor and having a distal portion extending from the proximal portion to a location external to the housing, the magnetic fields between the first and second magnets urging the collet into engagement with the force sensor to preload the force sensor.

16. The system of claim 15, wherein the second magnet is a substantially flat annular magnet, the first side of the second magnet being attached to the proximal portion of the collet.

17. The system of claim 15, wherein the distal portion of the collet terminates in an article engaging tip located external to the housing, the collet being urged in the direction of the first end of the housing in response to force applied at the article engaging tip, thereby reducing the distance between the first and second magnets and, in turn, reducing loading of the force sensor by an amount proportional to the applied force.

18. The system of claim 17, further including electronics operatively associated with the force sensor for providing an indication of the applied force based on a detected change in loading characteristics of the force sensor.

19. The system of claim 17, wherein each of the second end portion of the housing and the force sensor has an aperture extending axially therethrough, the distal portion of the collet extending through the respective apertures of the housing and the force sensor.

20. The system of claim 14, wherein the housing is threaded at the first end, the system further including a threaded end cap to which the first magnet is attached, the end cap being threaded onto to the first end to selectively position the first magnet at an axial position relative to the second magnet for preloading the force sensor a desired amount.

21. The system of claim 13, wherein the force receiving means further includes means for receiving an externally applied force in a second direction, which is opposite the first direction, the applied force including the sum of force due to the preloading and the externally applied force.

* * * * *